(12) United States Patent
Abedini et al.

(10) Patent No.: US 11,997,653 B2
(45) Date of Patent: May 28, 2024

(54) RELEASE CONFIGURATION OF SOFT RESOURCES IN INTEGRATED ACCESS AND BACKHAUL

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Muhammad Nazmul Islam, Littleton, MA (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,367

(22) Filed: Oct. 30, 2019

(65) Prior Publication Data

US 2020/0145992 A1 May 7, 2020

Related U.S. Application Data

(60) Provisional application No. 62/754,410, filed on Nov. 1, 2018.

(51) Int. Cl.
*H04W 72/04* (2009.01)
*H04L 5/00* (2006.01)
(Continued)

(52) U.S. Cl.
CPC .......... *H04W 72/27* (2023.01); *H04W 84/045* (2013.01)

(58) Field of Classification Search
CPC ........... H04W 72/0426; H04W 84/045; H04W 88/085; H04W 24/02; H04L 5/0064;
(Continued)

(56) References Cited

U.S. PATENT DOCUMENTS 10,009,260 B2 6/2018 Hampel et al.
10,136,359 B2 11/2018 Hampel et al.
(Continued)

FOREIGN PATENT DOCUMENTS

CN 107682935 A 2/2018
CN 107710824 A 2/2018
(Continued)

OTHER PUBLICATIONS

Chengdu, NR Physical Layer Design for IAB Backhaul Link, 3GPP TSG RAN WG1 MEETING/R1-1810538 Oct. 2018 (Year: 2018).*
(Continued)

*Primary Examiner* — Joseph E Dean, Jr.
(74) *Attorney, Agent, or Firm* — Harrity & Harrity, LLP/QUALCOMM Incorporated

(57) ABSTRACT

Various aspects of the present disclosure generally relate to wireless communication. In some aspects, a node may configure an operation mode associated with releasing soft resources associated with an integrated access backhaul (IAB) network that supports implicit release of soft resources and explicit release of soft resources. The node may provide information that identifies the operation mode. Numerous other aspects are provided.

51 Claims, 10 Drawing Sheets

(51) Int. Cl.
  *H04W 72/27* (2023.01)
  *H04W 84/04* (2009.01)
  *H04W 88/08* (2009.01)

(58) Field of Classification Search
  CPC ... H04L 5/0091; H04L 5/0044; H04L 5/0033; H04L 5/0023
  See application file for complete search history.

(56) References Cited

U.S. PATENT DOCUMENTS

| | | | |
|---|---|---|---|
| 10,924,212 B2 | 2/2021 | Cao et al. | |
| 11,503,586 B2* | 11/2022 | Jo | H04W 72/0446 |
| 2014/0036804 A1 | 2/2014 | Chen et al. | |
| 2014/0362688 A1 | 12/2014 | Zhang et al. | |
| 2016/0081084 A1 | 3/2016 | Blankenship et al. | |
| 2016/0344527 A1 | 11/2016 | Blankenship et al. | |
| 2017/0323343 A1 | 11/2017 | Dey et al. | |
| 2018/0049190 A1 | 2/2018 | Abedini et al. | |
| 2018/0092081 A1 | 3/2018 | Chen et al. | |
| 2018/0102821 A1 | 4/2018 | Manolakos et al. | |
| 2018/0103485 A1 | 4/2018 | Jiang et al. | |
| 2018/0302899 A1 | 10/2018 | Aijaz | |
| 2019/0021032 A1 | 1/2019 | Bergstrom et al. | |
| 2019/0141762 A1 | 5/2019 | Novlan et al. | |
| 2019/0150213 A1 | 5/2019 | Kim | |
| 2019/0349079 A1 | 11/2019 | Novlan et al. | |
| 2019/0357117 A1* | 11/2019 | Cudak | H04W 72/535 |
| 2020/0084688 A1 | 3/2020 | Mildh et al. | |
| 2020/0100124 A1 | 3/2020 | Hampel et al. | |
| 2020/0145991 A1 | 5/2020 | Abedini et al. | |
| 2020/0145993 A1 | 5/2020 | Abedini et al. | |
| 2020/0146099 A1 | 5/2020 | Abedini et al. | |
| 2021/0195674 A1* | 6/2021 | Park | H04B 7/15557 |
| 2022/0240235 A1 | 7/2022 | Abedini et al. | |
| 2022/0408520 A1 | 12/2022 | Abedini et al. | |

FOREIGN PATENT DOCUMENTS

| | | |
|---|---|---|
| CN | 108513323 A | 9/2018 |
| GB | 2576202 A | 2/2020 |
| WO | 2017004253 A1 | 1/2017 |
| WO | 2017004255 A1 | 1/2017 |
| WO | WO-2018048642 A1 | 3/2018 |

OTHER PUBLICATIONS

Ericsson: "Timing of IAB-node Transmissions," 3GPP Draft, 3GPP TSG-RAN WG1 Meeting #94bis, R1-1811449, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518852, 4 pages, Retrieved from the Internet: URL: http://www.3gpp.org/ftp/tsg%5Fran/WG1%5FRL1/TSGR1%5F94b/Docs/R1%2D1811449%2Ezip [retrieved on Sep. 28, 2018], 2 Discussion.
Ericsson: "Updated Summary of 7.2.3.1 Enhancements to Support NR Backhaul links", 3GPP TSG RAN WG1 Meeting #94bis, 3GPP Draft; R1-1812042, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Oct. 12, 2018, XP051519366, Retrieved from the Internet: URL:http://www.3gpp.org/ftp/tsg%5Fran/WG1%5FRL1/TSGR1%5F94b/Docs/R1%2D1812042%2Ezip [retrieved on Oct. 12, 2018], pp. 3-4, Vivo, pp. 9-15, 2 Dynamic resource allocation between backhaul and access links, 22 pages.
Ericsson: "Physical Layer Aspects of IAB," 3GPP Draft, 3GPP TSG-RAN WG1 Meeting #94bis, R1-1811512, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 28, 2018 (Sep. 28, 2018), XP051518914, 4 pages, Retrieved from the Internet: URL: http://www.3gpp.org/ftp/tsg%5Fran/WG1%5FRL1/TSGR1%5F94b/Docs/R1%2D1811512%2Ezip [retrieved on Sep. 28, 2018] Observation 4.
MCC Support: "Draft Report of 3GPP TSG RAN WG1 #94bis v0.1.0", 3GPP TSG RAN WG1 Meeting #95, R1-181xxxx, Spokane, USA, Nov. 12-16, 2018, 190 Pages (submission date: Oct. 16, 2018).
Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516809, 6 Pages, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]-[0002].
Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3, Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 3 "Conclusion".
MCC Support: "Final Report of 3GPP TSG RAN WG1 #94bis v1.0.0", 3GPP Draft, 3GPP TSG RAN WG1 Meeting #95, R1-1812101, Spokane, USA, Nov. 12-16, 2018, 197 Pages.
CATT: "NR Physical Layer Design for IAB Backhaul Link", 3GPP Draft, 3GPP TSG RAN WG1 Meeting #94bis, R1-1810538_IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018, XP051517946, 7 Pages, Retrieved from the Internet: URL:http://www.3gpp.org/ftp/tsg%5Fran/WG1%5FRL1/TSGR1%5F94b/Docs/R1%2D1810538%2Ezip [retrieved on Sep. 29, 2018] the whole document.
NEC: "Discussion on IAB", 3GPP Draft, 3GPP TSG RAN WG1 Meeting #94b, R1-1810806, Discussion on IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518211, 2 pages, Retrieved from the Internet: URL:http://www.3gpp.org/ftp/tsg%5Fran/WG1%5FRL1/TSGR1%5F94b/Docs/R1%2D1810806%2Ezip [retrieved on Sep. 28, 2018], sections 1, 3.
Partial International Search Report—PCT/US2019/059170—ISA/EPO—Apr. 9, 2020.
Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3rd Generation Partnership Project (3GPP), Mobile Competence Centre, 650, Route Des Lucioles, F-06921 Sophia-Antipolis Cede, vol. RAN WG2, No. Busan, South Korea, May 21, 2018-May 25, 2018, May 20, 2018 (May 20, 2018), XP051444329, 3 pages. Retrieved from the Internet: URL:http://www.3gpp.org/ftp/Meetings%5F3GPP%5FSYNC/RAN2/Docs/[retrieved on May 20, 2018], p. 2, figure 2, figures 1, 2, sections 1, 2.
Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018, XP051518915, 11 pages, Retrieved from the

(56) References Cited

OTHER PUBLICATIONS

Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations.<span id="_wysihtml5-undo" class="_wysihtml5-temp">.

Intel Corporation: "PHY Enhancements for NR IAB," 3GPP Draft, 3GPP TSG RAN WG1 #94bis, R1-1810770, 3rd Generation Partnership Project (3GPP), Mobile Competence Centre, 650, Route Des Lucioles, F-06921, Sophia-Antipolis Cedex, France, vol. RAN WG1, Oct. 8, 2018-Oct. 12, 2018, Sep. 29, 2018 (Sep. 29, 2018), pp. 1-13, XP051518175, Retrieved from the Internet URL:http://www.3gpp.org/ftp/tsg%5Fran/WG1%5FRL1/TSGR1%5F94b/Docs/R1%2D1810770%2Ezip sections 3, 3.1, 3.2, 5, 5.2, 5.3.

International Search Report and Written Opinion—PCT/US2019/059170—ISA/EPO—Jul. 29, 2020.

NEC: "Resource Allocation for NR PUCCH", 3GPP Draft, 3GPP TSG RAN WG1 Meeting 91, R1-1720380 PUCCH_RESOURCE_ALLOCATION_V3E, 3rd Generation Partnership Project (3GPP), Mobile Competence Centre, 650, Route Des Lucioles, F-06921 Sophia-Antipolis Cedex, France, vol. RAN WG1, No. Reno, Nevada; Nov. 27, 2017-Dec. 1, 2017, Nov. 18, 2017, XP051369943, Retrieved from the Internet: URL:http://www.3gpp.org/ftp/tsg%5Fran/WG1%5FRL1/TSGR1%5F91/Docs/ [retrieved on Nov. 18, 2017], 8 pages.

Qualcomm Incorporated: "Resource Allocation and Transmit Diversity for PUCCH", 3GPP Draft, 3GPP TSG RAN WG1 Meeting #90b, R1-1718566 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341747, 14 pages, Retrieved from the Internet:URL:http://www.3gpp.org/ftp/Meetings_3GPP_SYNC/RAN1/Docs/, [retrieved on Oct. 8, 2017], figures 1,2, sections 1, 2.

Qualcomm Incorporated: "Resource Allocation for PUCCH," 3GPP Draft, 3GPP TSG RAN WG1 Meeting #91, R1-1720686 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Reno, US; Nov. 27, 2017-Dec. 1, 2017, Nov. 18, 2017, XP051370147, 22 pages, Retrieved from the Internet: URL:http://www.3gpp.org/ftp/tsg%5Fran/WG1%5FRL1/TSGR1%5F91/Docs/ [retrieved on Nov. 18, 2017].

VIVO: "Enhancements to Support NR Backhaul Link", 3GPP Draft, 3GPP TSG RAN WG1 Meeting #94bis, R1-1810387, Enhancements to Support NR Backhaul Link-Final, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051517796, pp. 1-9, Retrieved from the Internet : URL:http://www.3gpp.org/ftp/tsg%5Fran/WG1%5FRL1/TSGR1%5F94b/Docs/R1%2D1810387%2Ezip [Retrieved on Sep. 29, 2018], sections 2.1.1, 2.2.1, 2.3.1, 2.3.2, 2.5.

AT&T: "Enhancements to Support NR Backhaul Links", 3GPP TSG RAN WG1 Meeting #94bis, R1-1810690, 3rd Generation Partnership Project, Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018, XP051518094, 15 pages, Chapter 2.3 "Frame Structure Design and Backhaul Multiplexing", Section 2.4.

Huawei, et al., "Physical Layer Design for NR IAB", 3GPP Draft, R1-1810130, 3GPP TSG RAN WG1 Meeting #94bis, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, 18 Pages, XP051517545.

LG Electronics: "Discussions on Access and Backhaul link Timing for NR IAB", 3GPP TSG RAN WG1 Meeting #94, R1-1808514, Gothenburg, Sweden, Aug. 20-24, 2018, pp. 1-12.

* cited by examiner

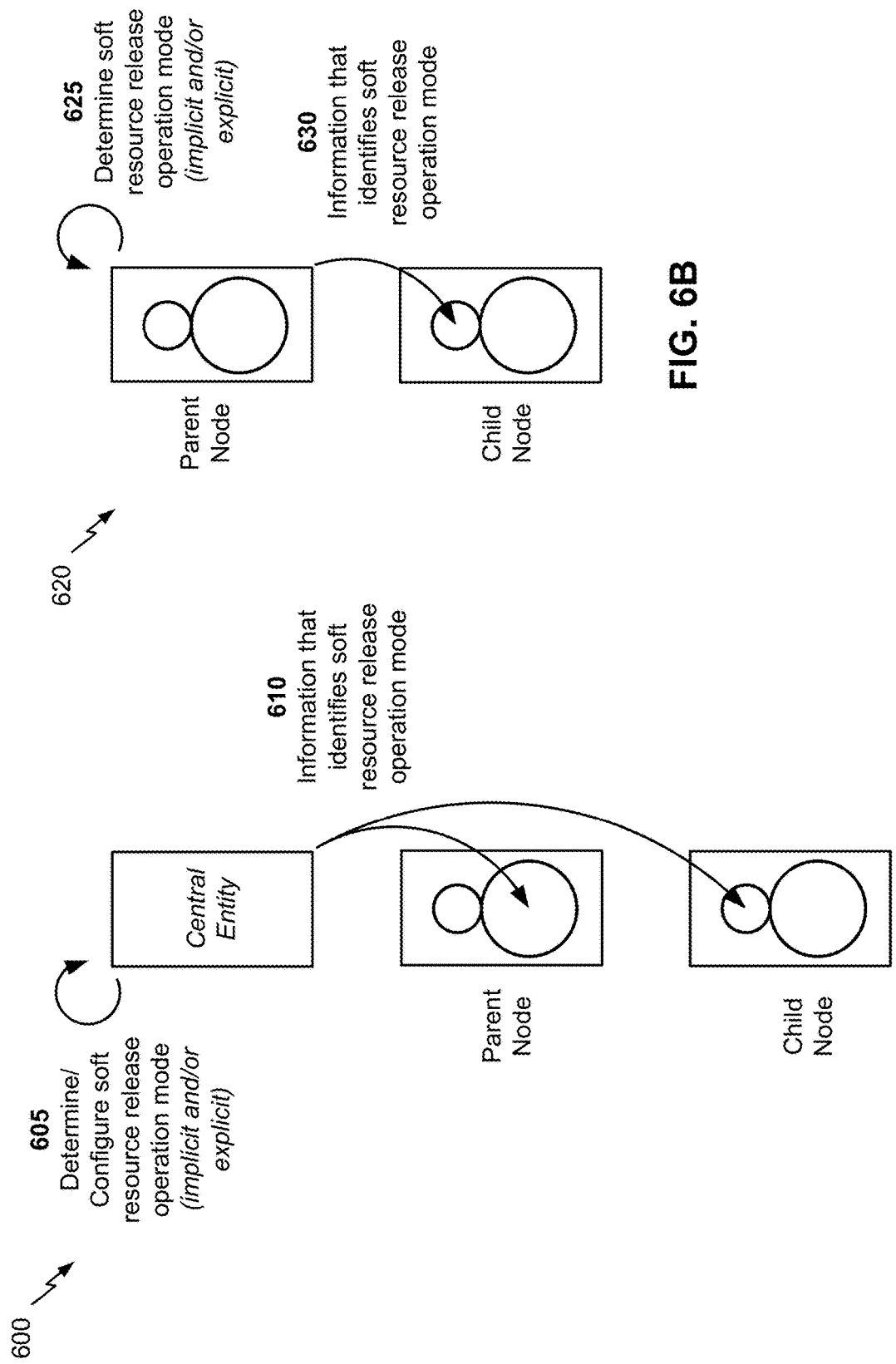

RELEASE CONFIGURATION OF SOFT RESOURCES IN INTEGRATED ACCESS AND BACKHAUL

CROSS-REFERENCE TO RELATED APPLICATION

This application claims priority to U.S. Provisional Patent Application No. 62/754,410, filed on Nov. 1, 2018, entitled "RELEASE CONFIGURATION OF SOFT RESOURCES IN INTEGRATED ACCESS AND BACKHAUL," which is hereby expressly incorporated by reference herein.

INTRODUCTION

Aspects of the present disclosure generally relate to wireless communication and to configuration of resources in integrated access and backhaul (IAB).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node, may include configuring an operation mode associated with releasing soft resources associated with an integrated access backhaul (IAB) network that supports implicit release of soft resources and explicit release of soft resources. The method may include providing information that identifies the operation mode.

In some aspects, a node for wireless communication may include memory and one or more processors operatively coupled to the memory. The memory and the one or more processors may be configured to configure an operation mode associated with releasing soft resources associated with an IAB network that supports implicit release of soft resources and explicit release of soft resources. The memory and the one or more processors may be configured to provide information that identifies the operation mode.

In some aspects, a non-transitory computer-readable medium may store one or more instructions for wireless communication. The one or more instructions, when executed by one or more processors of a node, may cause the one or more processors to configure an operation mode associated with releasing soft resources associated with an IAB network that supports implicit release of soft resources and explicit release of soft resources. The one or more instructions, when executed by one or more processors of a node, may cause the one or more processors to provide information that identifies the operation mode.

In some aspects, an apparatus for wireless communication may include means for configuring an operation mode associated with releasing soft resources associated with an IAB network that supports implicit release of soft resources and explicit release of soft resources. The apparatus may include means for providing information that identifies the operation mode.

In some aspects, a method of wireless communication, performed by a node, may include identifying an operation mode associated with releasing soft resources associated with an IAB network that supports implicit release of soft resources and explicit release of soft resources. The method may include selectively providing, in accordance with the operation mode, an indication of whether a set of soft resources associated with the IAB network is released.

In some aspects, a node for wireless communication may include memory and one or more processors operatively coupled to the memory. The memory and the one or more processors may be configured to identify an operation mode associated with releasing soft resources associated with an IAB network that supports implicit release of soft resources and explicit release of soft resources. The memory and the one or more processors may be configured to selectively provide, in accordance with the operation mode, an indication of whether a set of soft resources associated with the IAB network is released In some aspects, a non-transitory computer-readable medium may store one or more instructions for wireless communication. The one or more instructions, when executed by one or more processors of a node, may cause the one or more processors to identify an operation mode associated with releasing soft resources associated with an IAB network that supports implicit release of soft resources and explicit release of soft resources. The one or more instructions, when executed by one or more processors of a node, may cause the one or more processors to selectively provide, in accordance with the operation mode, an indication of whether a set of soft resources associated with the IAB network is released In some aspects, an apparatus for wireless communication may include means for identifying an operation mode associated with releasing soft resources associated with an IAB network that supports implicit release of soft resources and explicit release of soft resources. The apparatus may include means for selectively providing, in accordance with the operation mode, an indication of whether a set of soft resources associated with the IAB network is released.

In some aspects, a method of wireless communication, performed by a node, may include receiving an indication of an operation mode associated with releasing soft resources associated with an IAB network that supports implicit release of soft resources and explicit release of soft resources. The method may include selectively receiving, based at least in part on the operation mode, an indication of whether a set of soft resources associated with the IAB network is released.

In some aspects, a node for wireless communication may include memory and one or more processors operatively coupled to the memory. The memory and the one or more processors may be configured to receive an indication of an operation mode associated with releasing soft resources associated with an IAB network that supports implicit release of soft resources and explicit release of soft resources. The memory and the one or more processors may be configured to selectively receive, based at least in part on the operation mode, an indication of whether a set of soft resources associated with the IAB network is released.

In some aspects, a non-transitory computer-readable medium may store one or more instructions for wireless communication. The one or more instructions, when executed by one or more processors of a node, may cause the one or more processors to receive an indication of an operation mode associated with releasing soft resources associated with an IAB network that supports implicit release of soft resources and explicit release of soft resources. The one or more instructions, when executed by one or more processors of a node, may cause the one or more processors to selectively receive, based at least in part on the operation mode, an indication of whether a set of soft resources associated with the IAB network is released.

In some aspects, an apparatus for wireless communication may include means for receiving an indication of an operation mode associated with releasing soft resources associated with an IAB network that supports implicit release of soft resources and explicit release of soft resources. The apparatus may include means for selectively receiving, based at least in part on the operation mode, an indication of whether a set of soft resources associated with the IAB network is released.

Aspects generally include a method, apparatus, system, computer program product, non-transitory computer-readable medium, user equipment, base station, wireless node, node, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6C are diagrams illustrating examples associated with release configuration of soft resources in an IAB network, in accordance with various aspects of the present disclosure.

DETAILED DESCRIPTION

Figure 1:
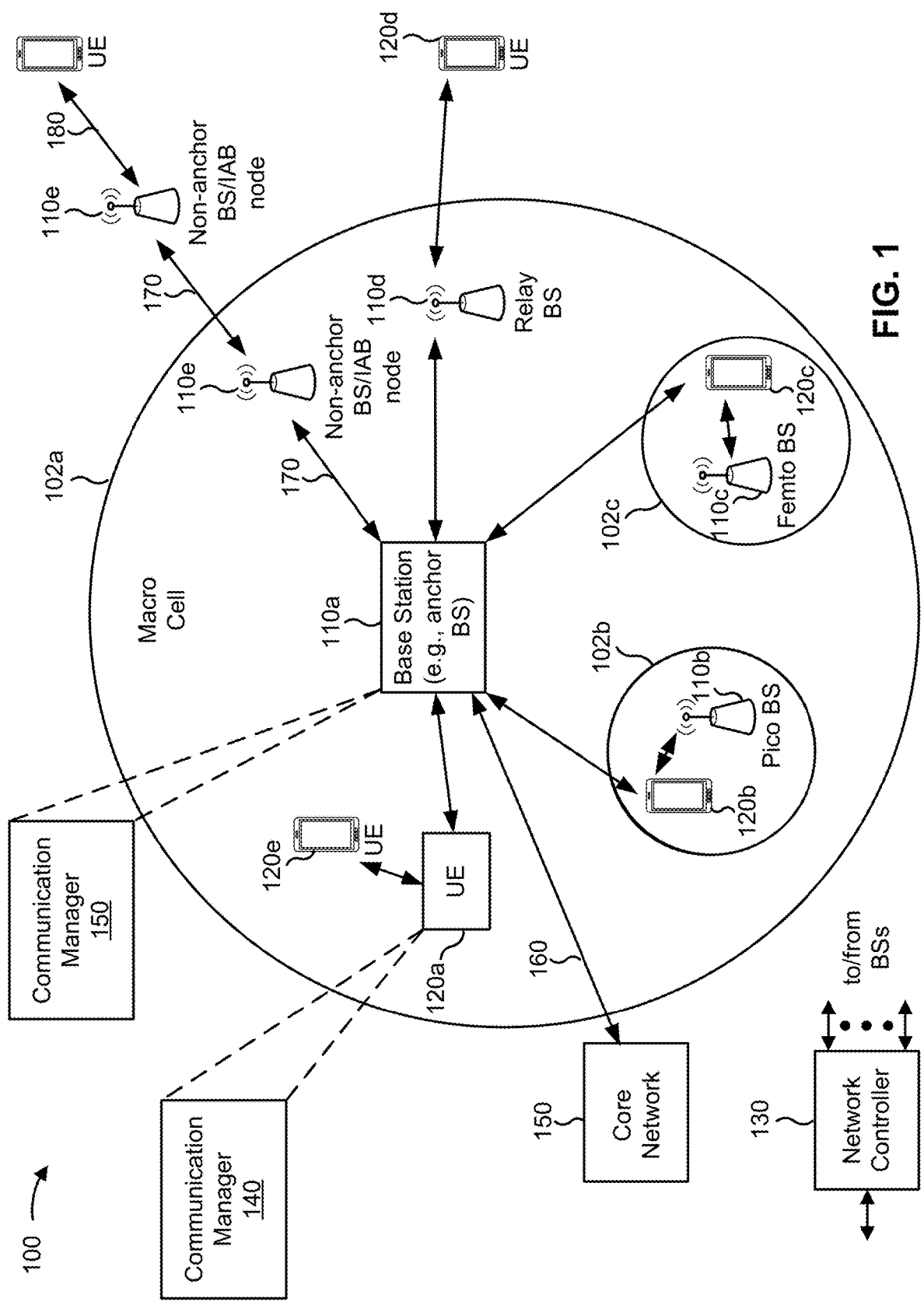
FIG. 1 is a block diagram conceptually illustrating an example of a wireless communication network, in accordance with various aspects of the present disclosure.

An IAB network may include a central unit and a plurality of IAB nodes. The central unit may perform configuration or other network functions for the plurality of IAB nodes. In some aspects, an IAB node may include an IAB donor, an anchor node, a non-anchor node, or a UE. A parent node (e.g., an IAB donor, an anchor node, or a non-anchor node) may have some control over resources of a child node (e.g., a non-anchor node or a UE) associated with the parent node. For example, a resource of the child node may be configurable by the parent node as schedulable by the child node or non-schedulable by the child node. Such a resource may be referred to as a soft resource of the child node. A child node may be associated with a parent node, meaning that that parent node can configure the child node's soft resources as schedulable or non-schedulable.

A release indication, associated with releasing soft resources (e.g., resources the availability of which are controlled by a parent node of the child node), can be explicit (e.g., when the parent node explicitly indicates that a set of soft resources is released for use by the child node) or implicit (e.g., when the parent node implicitly indicates that a set of soft resources is released for use by the child node). In operation of the IAB network, it is beneficial to provide support for both implicit release indications and explicit release indications since, depending on the scenario, one type of soft resource release may be more desirable over the other type of soft resources release (e.g., when one type of soft resource release may improve network performance as compared to the other).

However, when both implicit release and explicit release are supported, the IAB network may benefit from determining an operation mode for releasing soft resources (e.g., implicit release only, explicit release only, either implicit or explicit release) that is to be used for releasing soft resources. Further, the IAB network may benefit from configuring the determined operation mode on appropriate wireless nodes of the IAB network (e.g., parent nodes and child nodes that are to use the determined operation mode).

Some aspects describe herein provide techniques and apparatuses associated with determining an operation mode for releasing soft resources associated with an IAB network, configuring wireless nodes of the IAB network with the determined operation mode, and operating in accordance with the configured operation mode.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may coordinate and/or manage one or more operations of UE 120. Additionally, or alternatively, the communication manager 140 may perform one or more other operations described herein.

Similarly, the base station 110 may include a communication manager 150. As described in more detail elsewhere herein, the communication manager 150 may coordinate or manage one or more operations of base station 110. Additionally, or alternatively, the communication manager 150 may perform one or more other operations described herein.

Base station 110 (e.g., base station 110a or another base station shown in FIG. 1) may connect to a core network 150 via a backhaul 160. For example, the backhaul 160 may be a fiber backhaul. Base station 110a is referred to as an anchor BS in the terminology of an integrated access and backhaul (IAB) network, since base station 110a provides a fiber connection to the core network 150. Base station 110a may communicate with one or more base stations 110e (shown as non-anchor BS/IAB node) via a wireless connection 170. A non-anchor BS is a base station that does not provide a fiber connection to the core network 160. In an IAB network, a series of non-anchor BSs may access the core network 150 via wireless connections 170 and via the backhaul 160. A UE 120 may access the core network via an access link 180.

One IAB node (e.g., BS 110 or UE 120), termed a child node, may release a resource based at least in part on receiving a release indication. The release indication can be explicit (e.g., when another IAB node (e.g., BS 110), termed a parent node, explicitly indicates that a set of soft resources is released for use by a child node) or implicit (e.g., when a parent node implicitly indicates that a set of soft resources is released for use by a child node). Some aspects describe herein provide techniques and apparatuses associated with determining an operation mode for releasing soft resources associated with an IAB network, configuring wireless nodes (e.g., UE 120, BS 110, and/or the like) of the IAB network with the determined operation mode, and operating based at least in part on the configured operation mode.

As indicated above, FIG. 1 is provided merely as an example. Other examples may differ from what was described with regard to FIG. 1.

Figure 2:
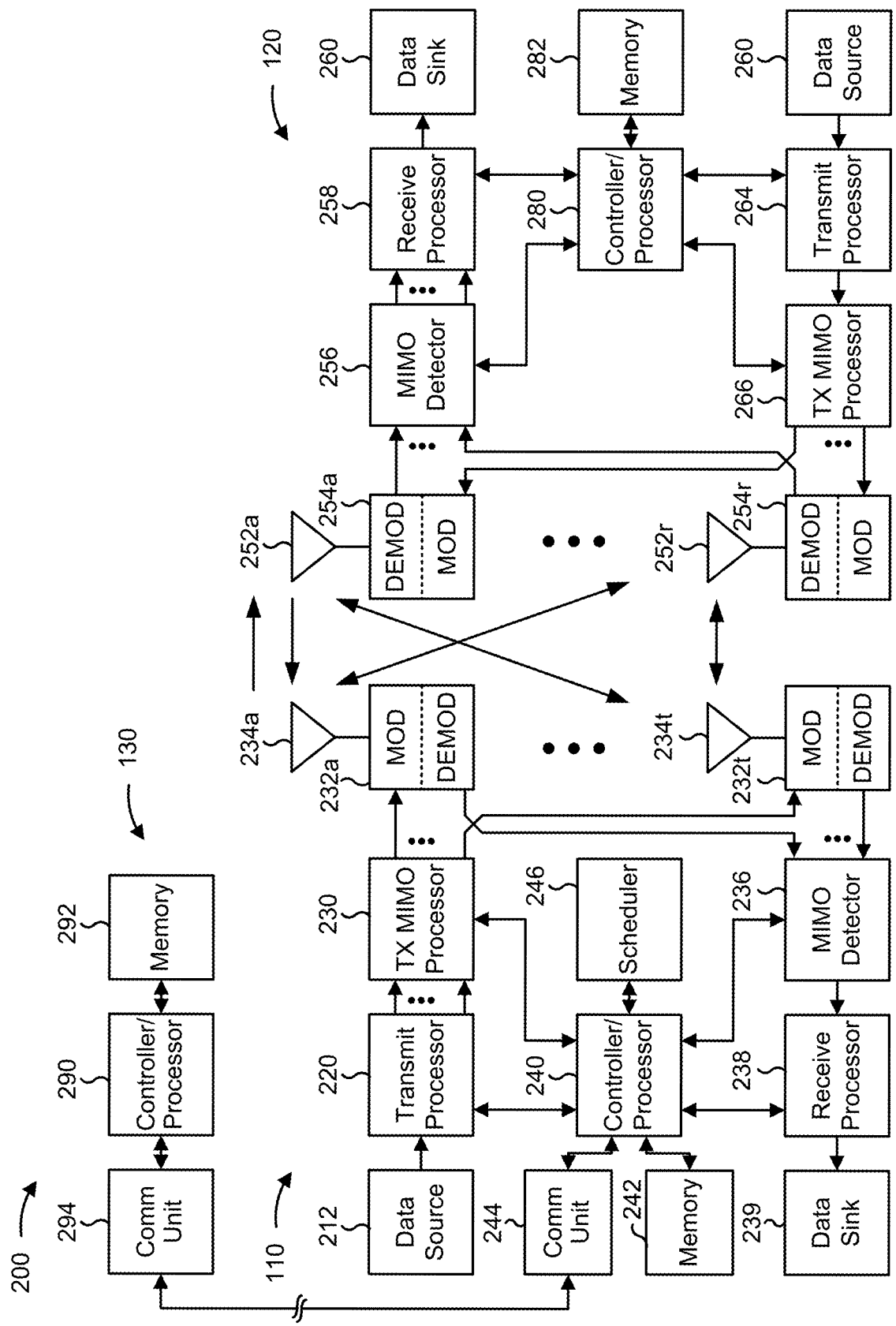
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with release configuration of soft resources in an IAB network, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9 and/or other processes as described herein. Memories 242 and 282 may store data and program codes for base station 110 and UE 120, respectively. A scheduler 246 may schedule UEs for data transmission on the downlink and/or uplink.

In some aspects, a node (e.g., a control node, such as the base station 110, the network controller 130, a DU, a CU, an IAB node, an IAB donor, and/or the like) may include means for configuring an operation mode associated with releasing soft resources associated with an IAB network that supports implicit release of soft resources and explicit release of soft resources; means for providing information that identifies the operation mode associated with releasing soft resources associated with the IAB network; and/or the like.

In some aspects, a node (e.g., a wireless node, such as the base station 110, a DU, an IAB node, an IAB donor, and/or the like) may include means for identifying an operation mode associated with releasing soft resources associated with an IAB network that supports implicit release of soft resources and explicit release of soft resources; means for selectively providing, in accordance with the operation mode, an indication of whether a set of soft resources associated with the IAB network is released; and/or the like.

In some aspects, a node (e.g., a wireless node, such as the UE 120, the base station 110, a DU, an IAB node, and/or the like) may include means for receiving an indication of an operation mode associated with releasing soft resources associated with an IAB network that supports implicit release of soft resources and explicit release of soft resources; means for selectively receiving, based at least in part on the operation mode, an indication of whether a set of soft resources associated with the IAB network is released; and/or the like.

Additionally, or alternatively, the wireless node may include means for performing one or more other operations described herein. In some aspects, such means may include the communication manager 140/150. In some aspects, such means may include one or more components of the UE 120, the base station 110, and/or the network controller 130 described in connection with FIG. 2.

As indicated above, FIG. 2 is provided merely as an example. Other examples may differ from what was described with regard to FIG. 2.

Figure 3:
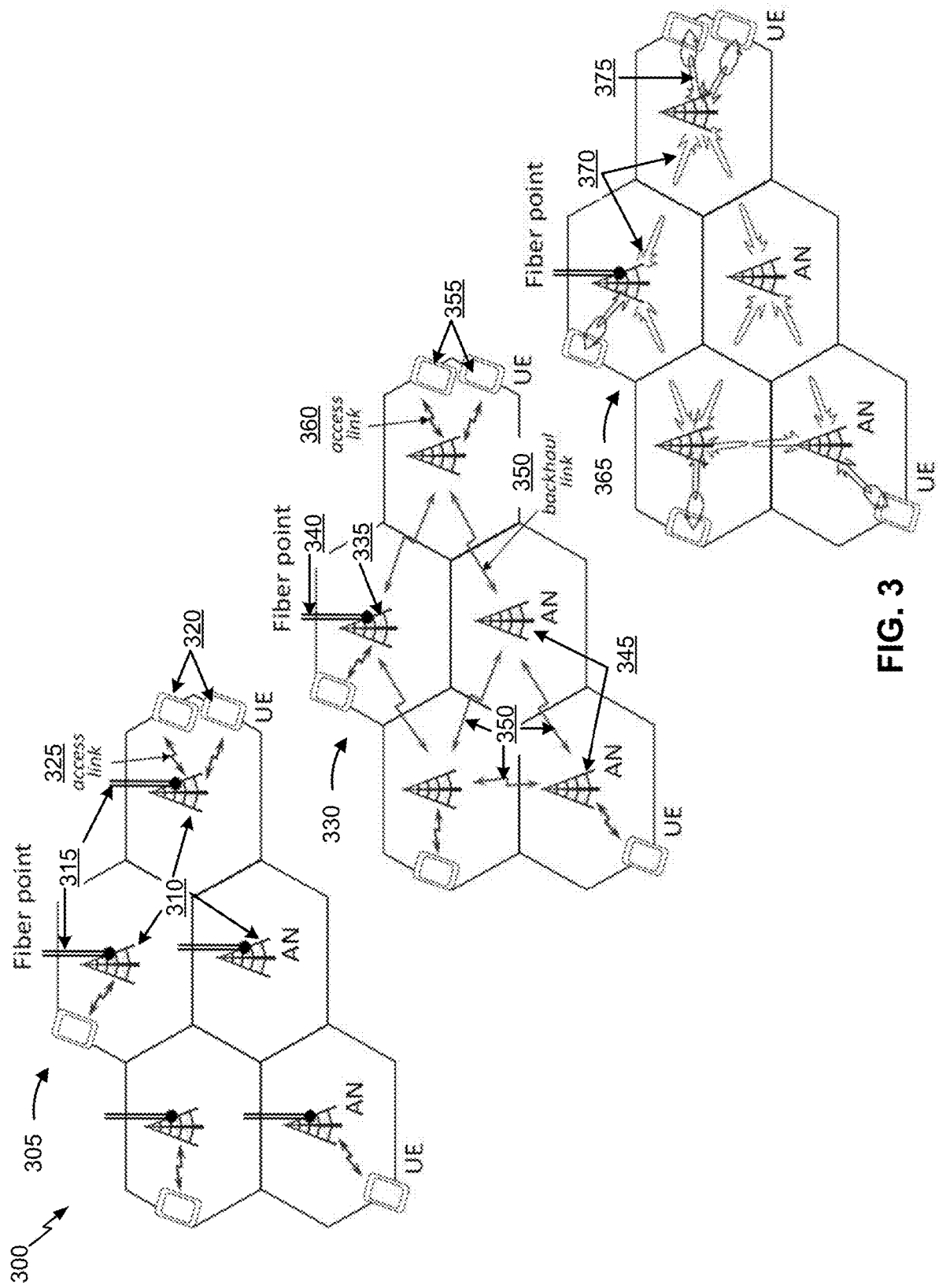
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples are possible and may differ from what was described with regard to FIG. 3.

Figure 4:
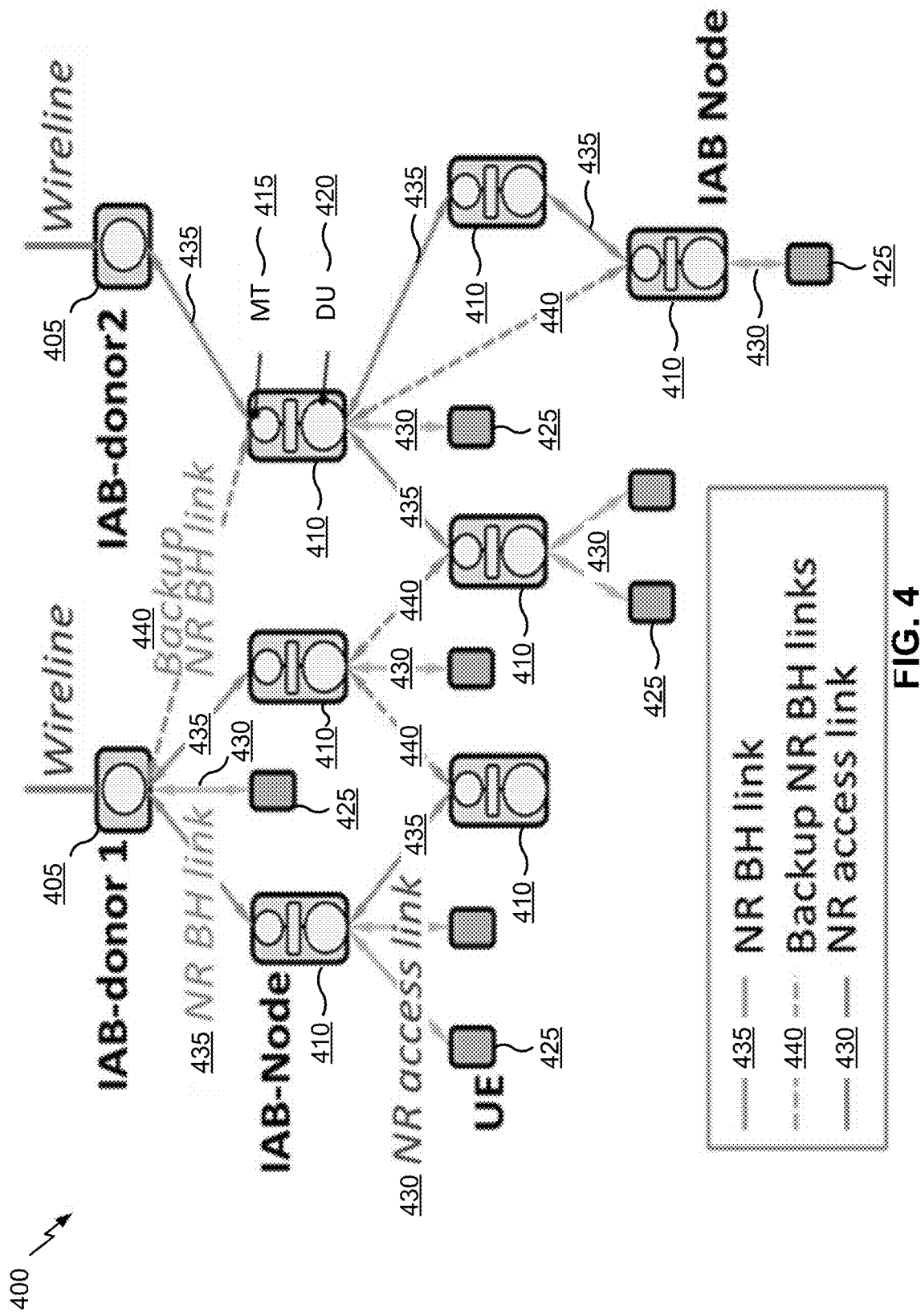
FIG. 4 is a diagram illustrating an example of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (e.g., AMF). In some aspects, an anchor node 405 may include a base station 110, such as an anchor base station, as described above in connection with FIG. 3.

As further shown in FIG. 4, the IAB network may include non-anchor nodes 410, or IAB nodes (shown as IAB-Node). A non-anchor node 410 may provide integrated access and backhaul functionality, and may include mobile terminal (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 440 may be used if a primary backhaul link fails, becomes congested, becomes overloaded, and/or the like.

As indicated above, FIG. 4 is provided as an example. Other examples are possible and may differ from what was described with regard to FIG. 4.

Figure 5:
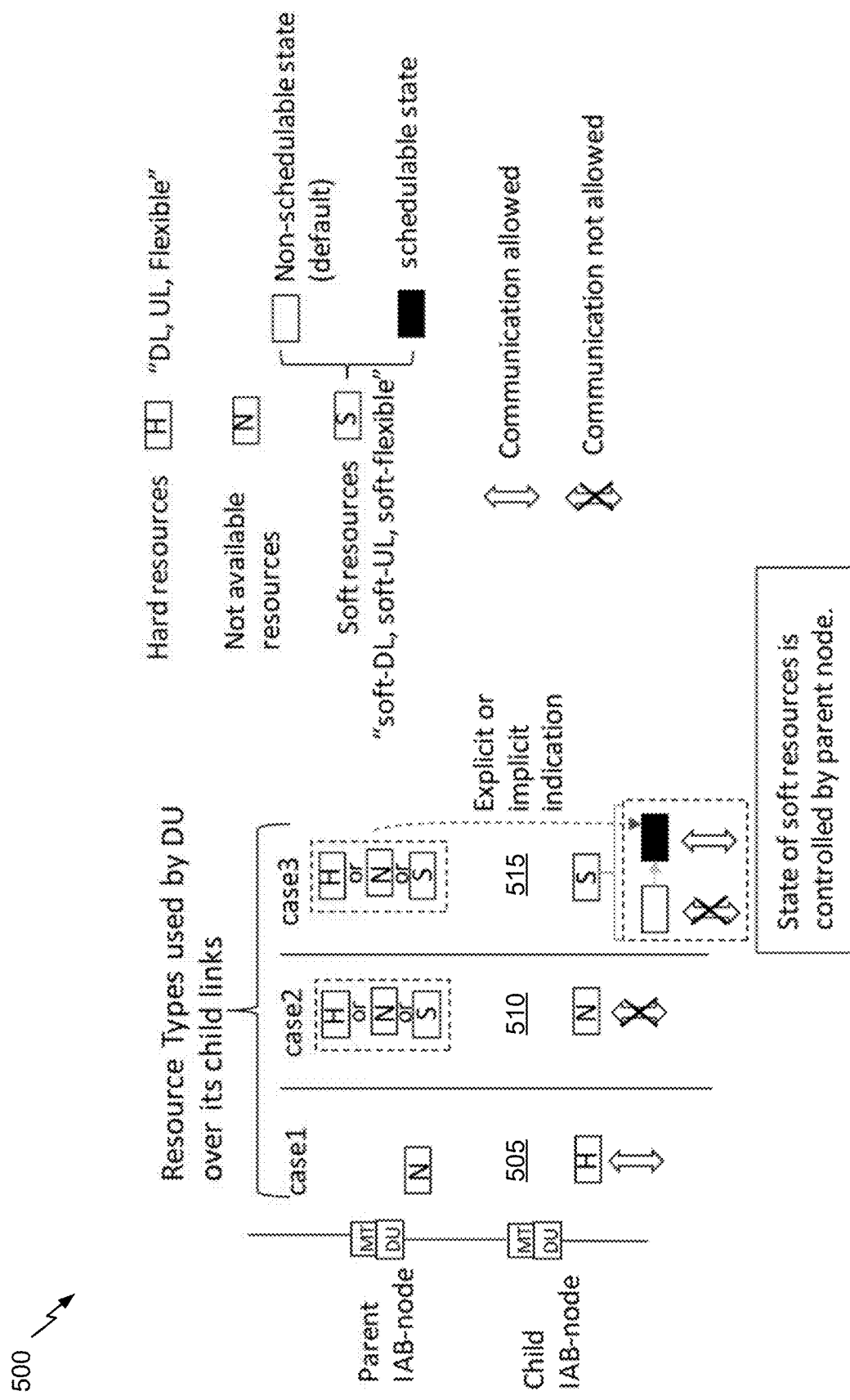
FIG. 5 is a diagram illustrating an example of resource types in an IAB network, in accordance with various aspects of the disclosure.

FIG. 5 is a diagram illustrating an example 500 of resource types in an IAB network, in accordance with various aspects of the disclosure.

In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives a release indication, from the parent node (e.g., explicitly or implicitly), that the time resource is available (i.e., released) for use by the child node. If the child node receives such a release indication, then the child node can schedule communications in that time resource and/or communicate using that time resource.

As indicated above, FIG. 5 is provided as an example. Other examples are possible and may differ from what was described with regard to FIG. 5.

As indicated above, a release indication, associated with releasing a soft resource for use by a child node in an IAB network, can be explicit (e.g., when a parent node explicitly indicates that a set of soft resources is released for use by a child node) or implicit (e.g., when a parent node implicitly indicates that a set of soft resources is released for use by a child node). In operation of the IAB network, it is beneficial to provide support for both implicit release indications and explicit release indications since, depending on the scenario, as one type of soft resource release may be more desirable than the other type of soft resources release (e.g., when one type of soft resource release may improve network performance as compared to the other).

However, when both implicit release and explicit release are supported, the IAB network may benefit from determining an operation mode for releasing soft resources (e.g., implicit release only, explicit release only, either implicit or explicit release) that is to be used for releasing soft resources. Further, the IAB network may benefit from configuring the determined operation mode on appropriate wireless nodes of the IAB network (e.g., parent nodes and child nodes that are to use the determined operation mode).

Some aspects described herein provide techniques and apparatuses associated with determining an operation mode for releasing soft resources associated with an IAB network, configuring wireless nodes of the IAB network with the determined operation mode, and operating based at least in part on the configured operation mode.

Figure 6C:
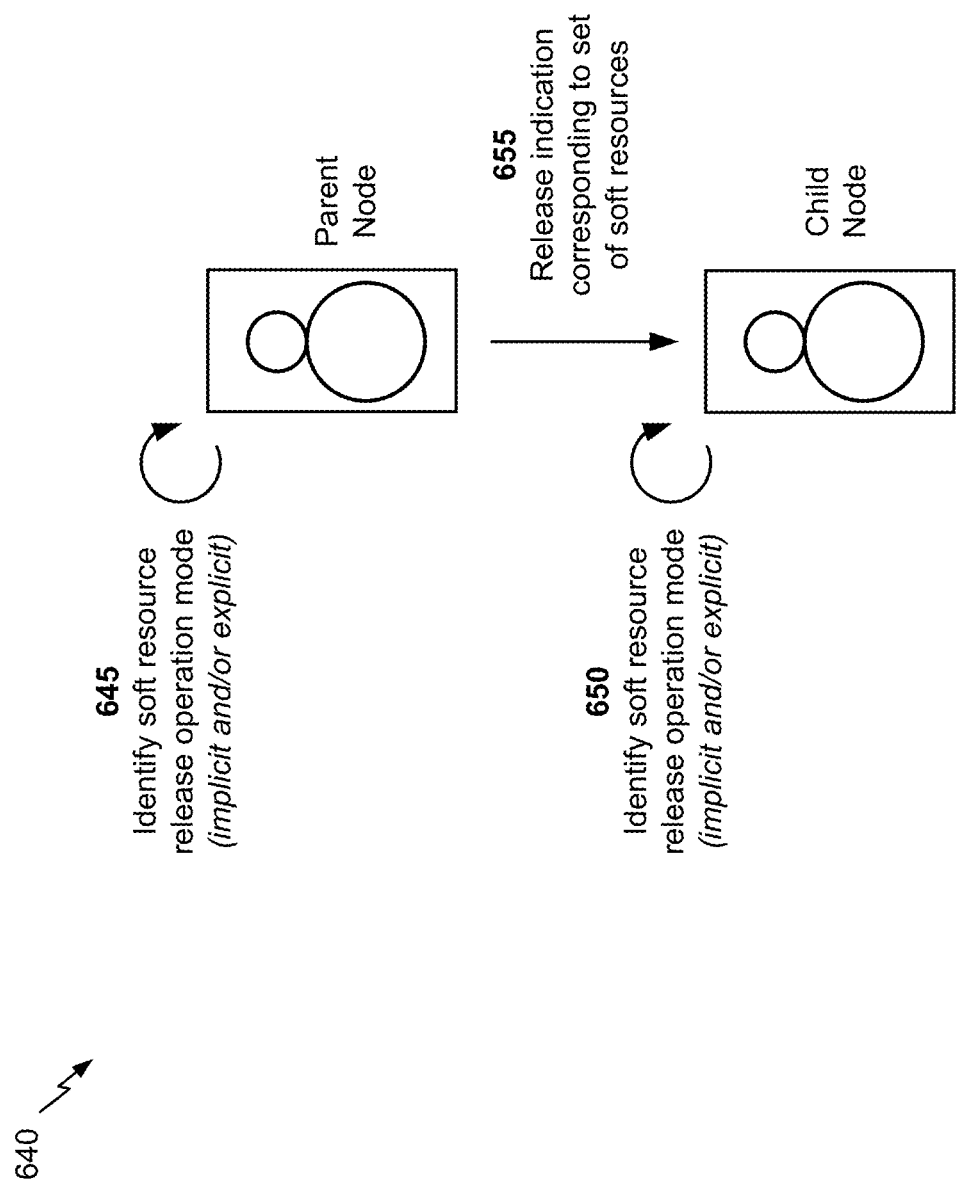

FIGS. 6A-6C are diagrams illustrating examples associated with release configuration of soft resources in an IAB network, in accordance with various aspects of the present disclosure.

As described above, it may be desirable for an IAB network to support both explicit release of soft resources and implicit release of soft resources and, therefore, the IAB network should be capable of determining an operation mode that is to be used for releasing soft resources (at a given time), and configuring one or more other wireless nodes, accordingly.

The operation mode is a mode of operation that indicates a type of release indication that is permitted for use in releasing soft resources of the IAB network. For example, the operation mode may indicate that only implicit release of soft resources is to be used in association with releasing soft resources associated with the IAB network (i.e., that only implicit release indications are to be used to release soft resources). As another example, the operation mode may indicate that only the explicit release of soft resources is to be used in association with releasing soft resources associated with the IAB network (i.e., that only explicit release indications are to be used to release soft resources). As yet another example, the operation mode may indicate that the explicit release of soft resources and the implicit release of soft resources are available to be used in association with releasing soft resources associated with the IAB network (i.e., that both implicit release indications and explicit release indications can be used to release soft resources).

In some aspects, a control node (e.g., wireless node or a wired node) of the IAB network may determine the operation mode associated with releasing soft resources. FIGS. 6A and 6B illustrate examples 600 and 620, respectively, of determination of the operation mode by different wireless nodes in the IAB network, and configuration of the operation mode on other nodes of the IAB network.

In some aspects, the control node that determines the operation mode may be a central entity component associated with the IAB network, such as a central unit (CU) of an anchor base station (e.g., a CU of an IAB donor). For example, as shown by reference number 605 in FIG. 6A, a central entity of the IAB network may determine the operation mode, in some aspects.

In some aspects, the control node that determines the operation mode may be a parent node that controls the soft resources associated with the IAB network. For example, as shown by reference number 625 in FIG. 6B, a parent node that controls the soft resources associated with the IAB network may determine the operation mode, in some aspects.

In some aspects, the control node (e.g., the central entity, the parent that controls the soft resources, and/or the like)

may determine the operation mode based at least in part on one or more parameters associated with the IAB network and/or one or more wireless nodes included in the IAB network.

In some aspects, the one or more parameters may include information associated with a capability of one or more wireless nodes included in the IAB network (e.g., one or more wireless nodes to be configured with the determined operation mode). The information associated with the capability may indicate, for example, a capability of a given wireless node to support a particular operation mode (e.g., whether the given wireless node is capable of supporting implicit release, whether the given wireless node is capable of supporting explicit release, whether the given wireless node is capable of simultaneously supporting implicit release and explicit release, and/or the like), and/or another type of capability information associated with the one or more wireless nodes.

In some aspects, the one or more parameters may include information associated with a topology of the IAB network. The information associated with the topology of the IAB network may include, for example, information that identifies a hop level of one or more wireless nodes (e.g., the one or more wireless nodes to be configured with the determined operation mode), information that identifies a number of hops in a tree or a sub-tree associated with the one or more wireless nodes, information that identifies a number of child nodes included in the one or more wireless nodes, information that identifies a number of parent nodes included in the one or more wireless nodes, information that identifies a number of neighboring (i.e., sibling) nodes included in the one or more wireless nodes, and/or the like.

In some aspects, the one or more parameters may include information associated with a traffic demand associated with the IAB network. The information associated with the traffic demand may include, for example, information indicating a level of traffic associated with the one or more wireless nodes (e.g., high, medium, low, and/or the like), information indicating an amount of traffic associated with the one or more wireless nodes, information indicating a level of congestion associated with the one or more wireless nodes (e.g., high, medium, low, and/or the like), and/or another type of information related to traffic demand. In some aspects, the information associated with the traffic demand may be current, predicted, expected, historical, and/or the like.

In some aspects, the one or more parameters may include information associated with a resource utilization associated with the IAB network. The information associated with the resource utilization may include, for example, information indicating a level of resource utilization by the one or more wireless nodes (e.g., high, medium, low, and/or the like), a resource utilization rate (e.g., a percentage from 0 to 100, and/or the like), and/or another type of information related to resource utilization. In some aspects, the information associated with the resource utilization may be current, predicted, expected, desired, historical, and/or the like.

In some aspects, the one or more parameters, based at least in part on which the operation mode is determined, may be signaled to the control node by the one or more wireless nodes. For example, the one or more wireless nodes may (automatically) signal the one or more parameters to the control node on a periodic basis. As another example, the one or more wireless nodes may signal the one or more parameters to the control node based at least in part on a request provided by the control node (e.g., when the control node requests the one or more parameters from the one or more wireless nodes). In some aspects, the control node may obtain the one or more parameters from another device associated with the IAB network.

In some aspects, the operation mode may apply to each wireless node included in the IAB network (e.g., when the central entity determines the operation mode for each wireless node under the central entity). In some aspects, the operation mode may apply to a subset of wireless nodes included in the IAB network (e.g., when a parent node that controls the soft resources determines the operation mode for child nodes of the parent node).

In some aspects, the operation mode may be specific to a particular set of soft resources. For example, the control node may determine a first operation mode (e.g., implicit release only) for a first set of soft resources associated with the IAB network, and may determine a second operation mode (e.g., explicit release only) for a second set of soft resources associated with the IAB network. In other words, the operation mode can vary among different sets of soft resources associated with the IAB network.

In some aspects, the operation mode may be a system-wide operation mode, wherein each wireless node of the IAB network is configured with the determined operation mode (e.g., when the central entity determines the operation mode).

In some aspects, the operation mode may be a local operation mode, wherein only a subset of all wireless nodes in the IAB network are to be configured with the determined operation mode (e.g., when a parent that controls the soft resources determines the operation mode for child nodes of the parent node). In this case, different parent nodes may determine operation modes for their respective child nodes, thereby allowing operation modes to be differently configured in different branches of the IAB network.

As further shown in FIGS. 6A and 6B, and by reference numbers 610 and 630, respectively, the control node that determines the operation mode (e.g., the central entity, the parent node that controls the soft resources) may provide information that identifies the operation mode to one or more wireless nodes of the IAB network (e.g., in order to configure the one or more wireless nodes with the determined operation mode).

In some aspects, as indicated in FIG. 6A, when the control node that determines the operation mode is the central entity, the information that identifies the operation mode is provided to a DU component of a parent node included in the IAB network. For example, the central entity can provide the information that identifies the operation mode to respective DU components of each parent node included in the IAB network (e.g., when the operation mode is to be configured system-wide). In some aspects, the information that identifies the operation mode can be provided to a DU component of a parent node via an F1-AP interface between the DU component and the central entity, via RRC signaling, via a parent node associated with the parent node, or a combination thereof. As further indicated in FIG. 6A, in some aspects, when the control node that determines the operation mode is the central entity, the information that identifies the operation mode is provided to an MT component of a child node included in the IAB network. For example, the central entity can provide the information that identifies the operation mode to respective MT components of each child node included in the IAB network. In some aspects, the information that identifies the operation mode can be provided to an MT component of a child node via a DU component of the child node, via a DU component of a parent node of the child node, via RRC signaling, or a combination thereof.

In some aspects, as indicated in FIG. 6B, when the control node that determines the operation mode is a parent node that controls the soft resources, the information that identifies the operation mode is provided directly to an MT component of a child node of the parent node. For example, the parent node can provide the information that identifies the operation mode to MT components of child nodes of the parent node (e.g., when the operation mode is to be locally configured).

In some aspects, when the operation mode indicates that both implicit release and explicit release are available to be used in association with releasing soft resources, the control node may further determine and provide prioritization information. In some aspects, the prioritization information includes information indicating a manner in which to prioritize explicit releases and implicit releases (e.g., in case of a conflict).

For example, the prioritization information may indicate that an explicit release of soft resources has priority over an implicit release of soft resources. Such prioritization may indicate that, when a set of soft resources are released by an explicit indication, the set of soft resources may not be un-released (i.e., taken back) via an implicit release indication (e.g., via scheduling DCI, RRC configuration, and/or the like). Here, if a given set of soft resources are not released by an explicit release indication, the given set of soft resources can be used or released via an implicit release indication, as needed.

As another example the prioritization information may indicate that an implicit release of soft resources has priority over an explicit release of soft resources. Such prioritization may indicate that, even if a set of soft resources is released via an explicit release indication, an implicit release indication may override the explicit release indication (e.g., DCI scheduling a new channel on released soft resources would require the child node to follow the schedule and give back the set of soft resources).

In some aspects, the prioritization information may indicate that a priority depends on a manner in which a release indication is provided. For example, the prioritization information may indicate that an implicit release indication provided via DCI has priority over an explicit release indication, but that an explicit release indication has priority over an implicit release indication provided via RRC configuration.

In some aspects, the prioritization information may be determined by the control node based at least in part on one or more parameters associated with the IAB network, in a manner similar to that described above.

In some aspects, the operation mode and/or the prioritization information associated with a given set of soft resources may change over time (e.g., through activation/deactivation signaling). For example, the control node may determine a first operation mode for the given set of soft resources, and may configure one or more wireless nodes, accordingly. Here, at a later time, the control node may determine a second (different) operation mode for the given set of soft resources, and may update the configuration on the one or more wireless nodes (e.g., such that information that identifies another operation mode is provided to the one or more wireless nodes at the later time). The prioritization information can be changed in a similar manner.

In this way, a control node (e.g., a central entity, a parent node that controls a given set of soft resources) can determine an operation mode associated with releasing soft resources associated with an IAB network, and configure one or more other wireless nodes with the operation mode.

FIG. 6C illustrates an example associated with a releasing soft resources associated with an IAB network.

As shown in FIG. 6C, and by reference number 645, a parent node may identify an operation mode associated with releasing soft resources associated with an IAB network. For example, when the central entity determines the operation mode, as described above, the parent node may receive information that identifies the operation mode (e.g., such that the parent node is configured with the operation mode determined by the central entity), and may identify the operation mode, accordingly. As another example, when the parent node determines the operation mode, as described above, the parent node may identify the operation mode based at least in part on the determining the operation mode.

As further shown in FIG. 6C, and by reference number 650, a child node may identify the operation mode associated with releasing soft resources associated with the IAB network. For example, the child node may receive (e.g., from the central entity or from the parent node) information that identifies the operation mode (e.g., such that the child node is configured with the operation mode determined by the central entity), as described above, and may identify the operation mode, accordingly.

As shown by reference number 655, the parent node may provide a release indication, corresponding to a set of soft resources associated with the IAB network, in accordance with the identified operation mode.

In some aspects, the release indication is an implicit release of the set of soft resources. The implicit release indication may be used when the operation mode indicates that only implicit releases can be used to release soft resources, or when the operation mode indicates that implicit releases and explicit release are available for use in releasing soft resources.

In some aspects, the release indication is provided via DCI, RRC signaling, or a combination of DCI and RRC signaling. For example, in some aspects, an implicit release of a set of soft resources may be indicated based at least in part on whether a communication (e.g., a downlink communication, an uplink communication) is configured in the set of soft resources. Here, if a communication is configured (e.g., via DCI, RRC signaling, and/or the like) in the set of soft resources, then the set of resources is implicitly not released for use by the child node. Conversely, if no communication is configured in the set of soft resources, then the set of soft resources is implicitly released for use by the child node.

In some aspects, the release indication is an explicit release of the set of soft resources. In some aspects, the explicit release indication may be provided via DCI, a group-common physical downlink control channel (PDCCH), a medium access control control element (MAC-CE), RRC signaling, and/or the like. The explicit release indication may be used when the operation mode indicates that only explicit releases can be used to release soft resources, or when the operation mode indicates that implicit releases and explicit release are available for use in releasing soft resources. In some aspects, the release indication is an explicit indication of whether the set of soft resources is released for use by the child node.

Generally, the release indication is to be provided sufficiently in advance of the set of soft resources. For example, the release indication is to be provided such that there is sufficient time for further release indications to be provided (e.g., when the child node is a parent node of another child node) and/or processing of a release indication in advance of the set of soft resources.

As indicated in FIG. 6C, the child node may receive, based at least in part on the information that identifies the operation mode, the release indication corresponding to the set of soft resources.

In some aspects, the child node may selectively provide a communication in the set of soft resources based at least in part on the release indication. For example, when the release indication (either implicit or explicit) indicates that the set of soft resources is released for use by the child node, the child node may schedule and provide a communication in the set of soft resources. Alternatively, when the release indication (either implicit or explicit) indicates that the set of soft resources is not released for use by the child node, the child node may not schedule or provide a communication in the set of soft resources.

In some aspects, the child node may selectively provide the communication based at least in part on prioritization information associated with the operation mode For example, when the operation mode indicates that implicit releases and explicit releases are available for use in releasing the set of soft resources, the child node may determine whether the set of soft resources is released based at least in part on the prioritization information (e.g., when the child node has received conflicting release indications), and may proceed accordingly.

As indicated above, FIGS. 6A-6C are provided as an example. Other examples may differ from what was described with respect to FIGS. 6A-6C.

Figure 7:
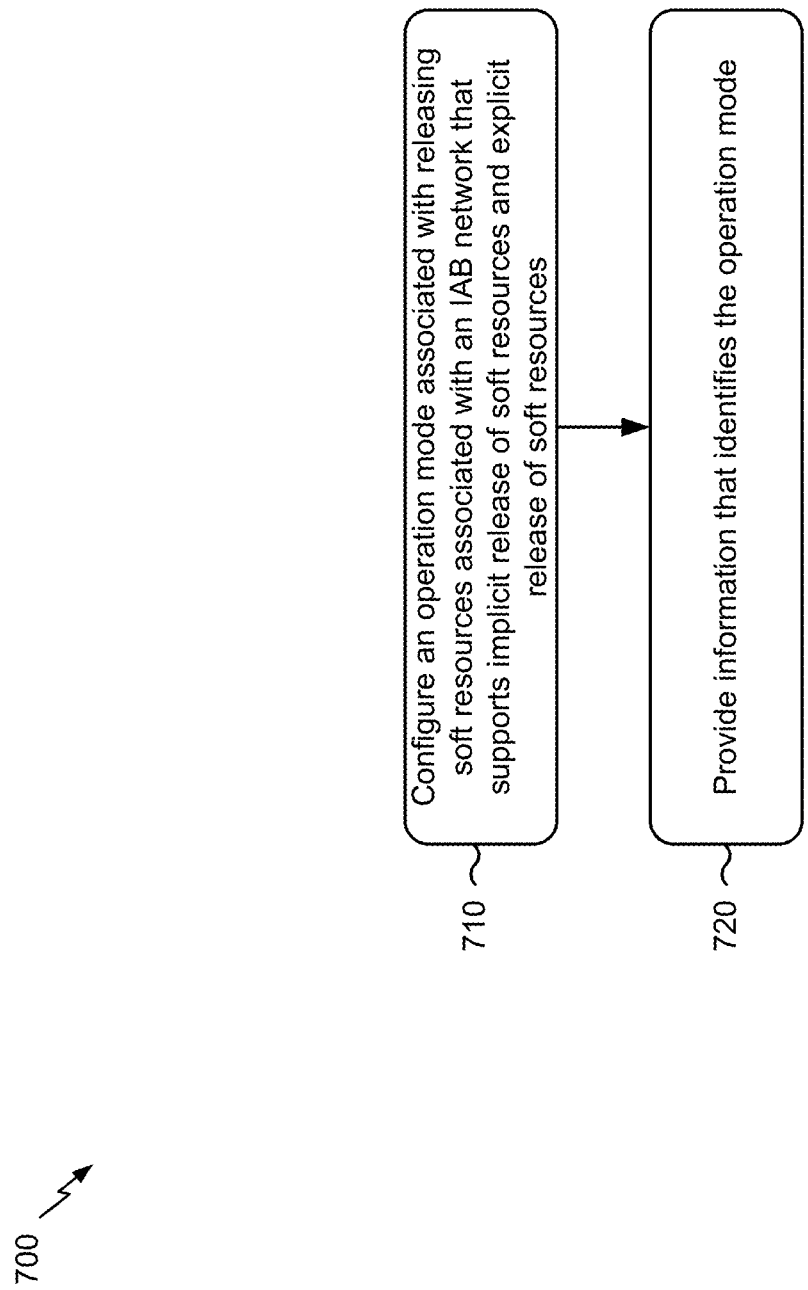
FIG. 7 is a diagram illustrating an example process performed, for example, by a wireless node, in accordance with various aspects of the present disclosure.

FIG. 7 is a diagram illustrating an example process 700 performed, for example, by a node, in accordance with various aspects of the present disclosure. Example process 700 is an example where the node (e.g., base station 110, network controller 130, a DU, a CU, an IAB donor, an IAB node, and/or the like) performs operations associated with release configuration of soft resources in an IAB network.

As shown in FIG. 7, in some aspects, process 700 may include configuring an operation mode associated with releasing soft resources associated with an IAB network that supports implicit release of soft resources and explicit release of soft resources (block 710). For example, the node (e.g., using transmit processor 220, controller/processor 240, and/or the like) may configure an operation mode associated with releasing soft resources associated with an IAB network that supports implicit release of soft resources and explicit release of soft resources, as described above.

As further shown in FIG. 7, in some aspects, process 700 may include providing information that identifies the operation mode (block 720). For example, the node (e.g., using antenna 234, TX MIMO processor 230, transmit processor 220, controller/processor 240, and/or the like) may provide information that identifies the operation mode associated with releasing soft resources associated with the IAB network, as described above.

Process 700 may include additional aspects, such as any single aspect or any combination of aspects described below and/or in connection with one or more other processes described elsewhere herein.

In a first aspect, the node is a central entity component associated with the IAB network, and providing the information that identifies the operation mode comprises providing the information that identifies the operation mode to at least one of: a distributed unit (DU) component of at least one of a parent node or a child node included in the IAB network, a mobile terminated (MT) component of at least one of the parent node or the child node included in the IAB network, or a combination thereof.

In a second aspect, alone or in combination with the first aspect, providing the information that identifies the operation mode comprises providing the information that identifies the operation mode via at least one of: an F1 application protocol (F1-AP) interface between the DU component and the central entity component; radio resource control (RRC) signaling; a parent node of the parent node; the DU component; or a combination thereof.

In a third aspect, alone or in combination with one or more of the first and second aspects, the node is a parent node that controls the soft resources associated with the IAB network, and providing the information that identifies the operation mode comprises providing the information that identifies the operation mode directly to a mobile terminated component of a child node of the parent node.

In a fourth aspect, alone or in combination with one or more of the first through third aspects, configuring the operation mode comprises configuring the operation mode based at least in part on at least one of: a capability of one or more wireless nodes included in the IAB network, a topology of the IAB network, a traffic demand associated with the IAB network, resource utilization associated with the IAB network, or a combination thereof.

In a fifth aspect, alone or in combination with one or more of the first through fourth aspects, process 700 includes receiving information associated with configuring the operation mode from one or more other wireless nodes included in the IAB network; and configuring the operation mode based at least in part on the information received from the one or more other wireless nodes included in the IAB network.

In a sixth aspect, alone or in combination with one or more of the first through fifth aspects, the operation mode is a system-wide configured operation mode or a locally configured operation mode.

In a seventh aspect, alone or in combination with one or more of the first through sixth aspects, the operation mode indicates that only the implicit release of soft resources is to be used in association with releasing soft resources associated with the IAB network.

In an eighth aspect, alone or in combination with one or more of the first through seventh aspects, the operation mode indicates that only the explicit release of soft resources is to be used in association with releasing soft resources associated with the IAB network.

In a ninth aspect, alone or in combination with one or more of the first through eighth aspects, the operation mode indicates that the explicit release of soft resources and the implicit release of soft resources are available to be used in association with releasing soft resources associated with the IAB network.

In a tenth aspect, alone or in combination with one or more of the first through ninth aspects, process 700 includes providing prioritization information associated with the explicit release of soft resources and the implicit release of soft resources.

In an eleventh aspect, alone or in combination with one or more of the first through tenth aspects, the prioritization information indicates that the explicit release of soft resources has priority over the implicit release of soft resources.

In a twelfth aspect, alone or in combination with one or more of the first through eleventh aspects, the prioritization information indicates that the implicit release of soft resources has priority over the explicit release of soft resources.

In a thirteenth aspect, alone or in combination with one or more of the first through twelfth aspects, the operation mode is a first operation mode, associated with a first set of soft resources, that differs from a second operation mode associated with a second set of soft resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
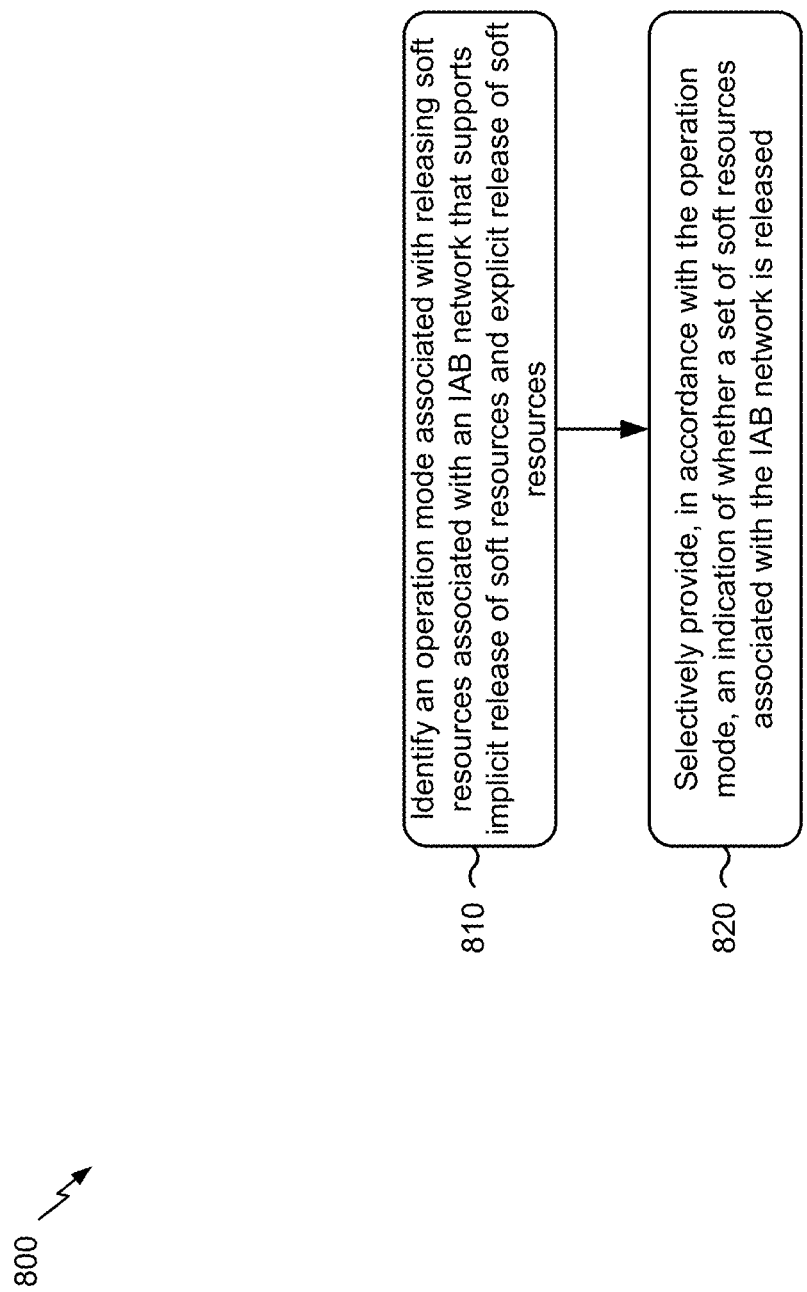
FIG. 8 is a diagram illustrating an example process performed, for example, by a wireless node, in accordance with various aspects of the present disclosure.

FIG. 8 is a diagram illustrating an example process 800 performed, for example, by a node, in accordance with various aspects of the present disclosure. Example process 800 is an example where the node (e.g., UE 120, base station 110, a DU, an IAB donor, an IAB node, and/or the like) performs operations associated with releasing soft resources in an IAB network.

As shown in FIG. 8, in some aspects, process 800 may include identifying an operation mode associated with releasing soft resources associated with an IAB network that supports implicit release of soft resources and explicit release of soft resources (block 810). For example, the node (e.g., using antenna 234, DEMOD 232, MIMO detector 236, receive processor 238, controller/processor 240, and/or the like) may identify an operation mode associated with releasing soft resources associated with an IAB network that supports implicit release of soft resources and explicit release of soft resources, as described above.

As further shown in FIG. 8, in some aspects, process 800 may include selectively providing, in accordance with the operation mode, an indication of whether a set of soft resources associated with the IAB network is released (block 820). For example, the node (e.g., using antenna 234, MOD 232, TX MIMO processor 230, transmit processor 220, controller/processor 240, and/or the like) may selectively provide, in accordance with the operation mode, an indication of whether a set of soft resources associated with the IAB network is released, as described above.

Process 800 may include additional aspects, such as any single aspect or any combination of aspects described below and/or in connection with one or more other processes described elsewhere herein.

In a first aspect, the operation mode indicates an implicit release of the set of soft resources, and the indication of whether the set of soft resources is released implicitly indicates that the set of soft resources is not released due to configuring of one or more communications in the set of soft resources.

In a second aspect, alone or in combination with the first aspect, selectively providing the indication of whether the set of soft resources is released comprises providing the indication of whether the set of soft resources is released via at least one of: downlink control information (DCI); radio resource control (RRC) signaling; or a combination of DCI and RRC signaling.

In a third aspect, alone or in combination with one or more of the first and second aspects, the operation mode indicates an implicit release of the set of soft resources, and selectively providing the indication of whether a set of soft resources is released comprises refraining from configuring a communication in the set of soft resources.

In a fourth aspect, alone or in combination with one or more of the first through third aspects, the operation mode indicates an explicit release of the set of soft resources, and the indication of whether the set of soft resources is released explicitly indicates that the set of soft resources is released.

In a fifth aspect, alone or in combination with one or more of the first through fourth aspects, selectively providing the indication of whether the set of soft resources is released comprises providing the indication of whether the set of soft resources is released via at least one of: downlink control information (DCI); a group-common physical downlink control channel (PDCCH); a medium access control control element (MAC-CE); radio resource control (RRC) signaling; or a combination thereof.

In a sixth aspect, alone or in combination with one or more of the first through fifth aspects, identifying the operation mode comprises receiving an indication of the operation mode from another node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
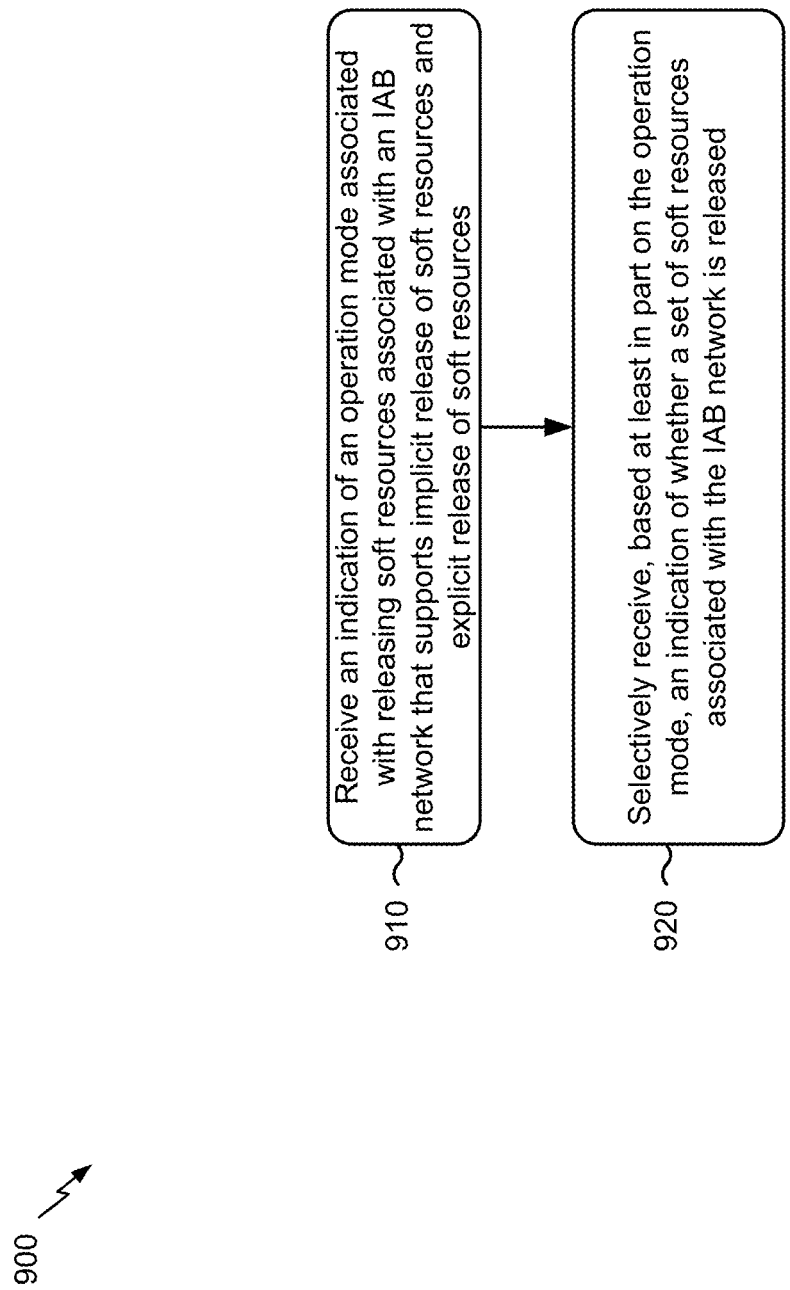
FIG. 9 is a diagram illustrating an example process performed, for example, by a wireless node, in accordance with various aspects of the present disclosure.

FIG. 9 is a diagram illustrating an example process 900 performed, for example, by a node, in accordance with various aspects of the present disclosure. Example process 900 is an example where the node (e.g., UE 120, base station 110, a DU, an MT, an IAB donor, an IAB node, and/or the like) performs operations associated with releasing soft resources in an IAB network.

As shown in FIG. 9, in some aspects, process 900 may include receiving an indication of an operation mode associated with releasing soft resources associated with an IAB network that supports implicit release of soft resources and explicit release of soft resources (block 910). For example, the node (e.g., using antenna 234, DEMOD 232, MIMO detector 236, receive processor 238, controller/processor 240, and/or the like) may receive an indication of an operation mode associated with releasing soft resources associated with an IAB network that supports implicit release of soft resources and explicit release of soft resources, as described above.

As further shown in FIG. 9, in some aspects, process 900 may include selectively receiving, based at least in part on the operation mode, an indication of whether a set of soft resources associated with the IAB network is released (block 920). For example, the node (e.g., using antenna 234, DEMOD 232, MIMO detector 236, receive processor 238, controller/processor 240, and/or the like) may selectively receiving, based at least in part on the operation mode, an indication of whether a set of soft resources associated with the IAB network is released, as described above.

Process 900 may include additional aspects, such as any single aspect or any combination of aspects described below and/or in connection with one or more other processes described elsewhere herein.

In a first aspect, the operation mode indicates an implicit release of the set of soft resources, and the indication of whether the set of soft resources is released implicitly indicates that the set of soft resources is not released due to configuring of one or more communications in the set of soft resources.

In a second aspect, alone or in combination with the first aspect, selectively receiving the indication of whether the set of soft resources is released comprises receiving the indication of whether the set of soft resources is released via at least one of: downlink control information (DCI); radio resource control (RRC) signaling; or a combination of DCI and RRC signaling.

In a third aspect, alone or in combination with one or more of the first and second aspects, the operation mode indicates an implicit release of the set of soft resources, and selectively receiving the indication of whether a set of soft resources is released comprises failing to receive a configuration of a communication in the set of soft resources; and process 900 includes determining that the set of soft resources is released based at least in part on failing to receive the configuration of the communication in the set of soft resources.

In a fourth aspect, alone or in combination with one or more of the first through third aspects, the operation mode indicates an explicit release of the set of soft resources, and the indication of whether the set of soft resources is released explicitly indicates that the set of soft resources is released.

In a fifth aspect, alone or in combination with one or more of the first through fourth aspects, selectively receiving the indication of whether the set of soft resources is released comprises receiving the indication of whether the set of soft resources is released via at least one of: downlink control information (DCI); a group-common physical downlink control channel (PDCCH); a medium access control control element (MAC-CE); radio resource control (RRC) signaling; or a combination thereof.

In a sixth aspect, alone or in combination with one or more of the first through fifth aspects, process 900 includes selectively transmitting a communication in the set of soft resources based at least in part on whether the set of soft resources is released.

In a seventh aspect, alone or in combination with one or more of the first through sixth aspects, process 900 includes selectively transmitting the communication based at least in part on prioritization information associated with the explicit release of soft resources and the implicit release of soft resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a node, comprising:
configuring an operation mode associated with releasing soft resources associated with an integrated access backhaul (IAB) network that supports implicit release of soft resources and explicit release of soft resources, wherein the node is a parent node, and wherein configuring the operation mode comprises configuring the operation mode based at least in part on a capability of an IAB node that is a child node of the node; and
communicating with the IAB node based on the operation mode.

2. The method of claim 1, further comprising:
providing information that identifies the operation mode to at least one of:
a distributed unit (DU) component of the IAB node,
a mobile terminated (MT) component of the IAB node, or
a combination thereof.

3. The method of claim 2, wherein providing the information that identifies the operation mode comprises providing the information that identifies the operation mode via at least one of:
an F1 application protocol (F1-AP) interface between the DU component and the node;
radio resource control (RRC) signaling;
a parent node of the node;
the DU component; or
a combination thereof.

4. The method of claim 1, wherein the node controls the soft resources associated with the IAB network, and wherein the method further comprises providing information that identifies the operation mode directly to a mobile terminated component of the IAB node.

5. The method of claim 1, wherein the operation mode is configured further based at least in part on at least one of:
a topology of the IAB network,
a traffic demand associated with the IAB network,
resource utilization associated with the IAB network, or
a combination thereof.

6. The method of claim 1, further comprising:
receiving information associated with configuring the operation mode from one or more other wireless nodes included in the IAB network; and
configuring the operation mode based at least in part on the information received from the one or more other wireless nodes included in the IAB network.

7. The method of claim 1, wherein the operation mode is a system-wide configured operation mode or a locally configured operation mode.

8. The method of claim 1, wherein the operation mode indicates that only the implicit release of soft resources is to be used in association with releasing the soft resources associated with the IAB network.

9. The method of claim 1, wherein the operation mode indicates that only the explicit release of soft resources is to be used in association with releasing the soft resources associated with the IAB network.

10. The method of claim 1, wherein the operation mode indicates that the explicit release of soft resources and the implicit release of soft resources are available to be used in association with releasing the soft resources associated with the IAB network.

11. The method of claim 10, further comprising providing prioritization information associated with the explicit release of soft resources and the implicit release of soft resources.

12. The method of claim 11, wherein the prioritization information indicates that the explicit release of soft resources has priority over the implicit release of soft resources.

13. The method of claim 11, wherein the prioritization information indicates that the implicit release of soft resources has priority over the explicit release of soft resources.

14. The method of claim 1, wherein the soft resources associated with the IAB network are a first set of soft resources that differ from a second set of soft resources associated with the IAB network, and wherein the operation mode is a first operation mode, associated with the first set of soft resources, that differs from a second operation mode associated with the second set of soft resources.

15. The method of claim 1, wherein the explicit release of soft resources is via downlink control information (DCI).

16. The method of claim 1, wherein the capability indicates whether the IAB node supports the operation mode.

17. A node for wireless communication, comprising:
a memory; and
one or more processors coupled to the memory, the one or more processors configured to:
configure an operation mode associated with release of soft resources associated with an integrated access backhaul (IAB) network that supports implicit release of soft resources and explicit release of soft resources, wherein the node is a parent node, and wherein, when configuring the operation mode, the one or more processors are configured to configure the operation mode based at least in part on a capability of an IAB node that is a child node of the node; and
communicate with the IAB node based on the operation mode.

18. The node of claim 17, wherein the one or more processors are further configured to:
provide information that identifies the operation mode to at least one of:
a distributed unit (DU) component of the IAB node,
a mobile terminated (MT) component of the IAB node, or
a combination thereof.

19. The node of claim 18, wherein the one or more processors, to provide the information that identifies the operation mode, are configured to provide the information that identifies the operation mode via at least one of:
an F1 application protocol (F1-AP) interface between the DU component and the node;
radio resource control (RRC) signaling;
a parent node of the node;
the DU component; or
a combination thereof.

20. The node of claim 17, wherein the node controls the soft resources associated with the IAB network, and wherein the one or more processors are further configured to provide information that identifies the operation mode directly to a mobile terminated component of the IAB node.

21. The node of claim 17, wherein the operation mode is configured further based at least in part on at least one of:
a topology of the IAB network,
a traffic demand associated with the IAB network,
resource utilization associated with the IAB network, or
a combination thereof.

22. The node of claim 17, wherein the one or more processors are further configured to:
receive information associated with configuring the operation mode from one or more other wireless nodes included in the IAB network; and
configure the operation mode based at least in part on the information received from the one or more other wireless nodes included in the IAB network.

23. The node of claim 17, wherein the operation mode is a system-wide configured operation mode or a locally configured operation mode.

24. The node of claim 17, wherein the operation mode indicates that only the implicit release of soft resources is to be used in association with the soft resources associated with the IAB network.

25. The node of claim 17, wherein the operation mode indicates that only the explicit release of soft resources is to be used in association with the soft resources associated with the IAB network.

26. The node of claim 17, wherein the operation mode indicates that the explicit release of soft resources and the implicit release of soft resources are available to be used in association with the soft resources associated with the IAB network.

27. The node of claim 17, wherein the one or more processors are further configured to provide prioritization information associated with the explicit release of soft resources and the implicit release of soft resources.

28. The node of claim 27, wherein the prioritization information indicates that the explicit release of soft resources has priority over the implicit release of soft resources.

29. The node of claim 27, wherein the prioritization information indicates that the implicit release of soft resources has priority over the explicit release of soft resources.

30. The node of claim 17, wherein the soft resources associated with the IAB network are a first set of soft resources that differ from a second set of soft resources associated with the IAB network, and wherein the operation mode is a first operation mode, associated with the first set of soft resources, that differs from a second operation mode associated with the second set of soft resources.

31. The node of claim 17, wherein the explicit release of soft resources is via downlink control information (DCI).

32. The node of claim 17, wherein the capability indicates whether the IAB node supports the operation mode.

33. A non-transitory computer-readable medium storing a set of instructions for wireless communication, the set of instructions comprising:
   one or more instructions that, when executed by one or more processors of a node, cause the node to:
      configure an operation mode associated with release of soft resources associated with an integrated access backhaul (IAB) network that supports implicit release of soft resources and explicit release of soft resources, wherein the node is a parent node, and wherein the one or more instructions that cause the node to configure the operation mode comprise one or more instructions that cause the node to configure the operation mode based at least in part on a capability of an IAB node that is a child node of the node; and
   communicate with the IAB node based on the operation mode.

34. An apparatus for wireless communication, comprising:
   means for configuring an operation mode associated with release of soft resources associated with an integrated access backhaul (IAB) network that supports implicit release of soft resources and explicit release of soft resources, wherein the apparatus is a parent apparatus, and wherein the means for configuring the operation mode comprise means for configuring the operation mode based at least in part on a capability of an IAB node that is a child of the apparatus; and
   means for communicating with the IAB node based on the operation mode.

35. A node for wireless communication, comprising:
   a memory; and
   one or more processors configured to:
      configure an operation mode associated with release of one or more soft resources associated with an integrated access backhaul (IAB) network, wherein the IAB network supports explicit release of the one or more soft resources, and wherein the operation mode is configured based at least in part on a capability of an IAB node that is a child node of the node; and
      communicate with the IAB node based on the operation mode.

36. The node of claim 35, wherein the one or more soft resources associated with the IAB network are a first set of soft resources that differs from a second set of soft resources associated with the IAB network, and wherein the operation mode is a first operation mode, associated with the first set of soft resources, that differs from a second operation mode associated with the second set of soft resources.

37. The node of claim 35, wherein the IAB network further supports an implicit determination of availability of a soft resource.

38. The node of claim 35, wherein the explicit release of the one or more soft resources is via downlink control information (DCI).

39. The node of claim 35, wherein the capability indicates whether the IAB node supports the operation mode.

40. A method of wireless communication performed at a node, comprising:
   configuring an operation mode associated with releasing one or more soft resources associated with an integrated access backhaul (IAB) network, the IAB network supporting explicit release of the one or more soft resources, and wherein the operation mode is configured based at least in part on a capability of an IAB node that is a child node of the node; and
   communicating with the IAB node based on the operation mode.

41. The method of claim 40, wherein the IAB network further supports an implicit determination of availability of a soft resource.

42. The method of claim 40, wherein the explicit release of the one or more soft resources is via downlink control information (DCI).

43. The method of claim 40, wherein the capability indicates whether the IAB node supports the operation mode.

44. A non-transitory computer-readable medium storing a set of instructions for wireless communication, the set of instructions comprising:
   one or more instructions that, when executed by one or more processors of a node, cause the node to:
      configure an operation mode associated with releasing one or more soft resources associated with an integrated access backhaul (IAB) network, the IAB network supporting explicit release of the one or more soft resources, and wherein the operation mode is configured based at least in part on a capability of an IAB node that is a child node of the node; and
      communicate with the IAB node based on the operation mode.

45. The non-transitory computer-readable medium of claim 44, wherein the IAB network further supports an implicit determination of availability of a soft resource.

46. The non-transitory computer-readable medium of claim 44, wherein the explicit release of the one or more soft resources is via downlink control information (DCI).

47. The non-transitory computer-readable medium of claim 44, wherein the capability indicates whether the IAB node supports the operation mode.

48. An apparatus for wireless communication, comprising:
   means for configuring an operation mode associated with releasing one or more soft resources associated with an integrated access backhaul (IAB) network, the IAB network supporting explicit release of the one or more soft resources, and wherein the operation mode is configured based at least in part on a capability of an IAB node that is a child node of the apparatus; and
   means for communicating with the IAB node based on the operation mode.

49. The apparatus of claim 48, wherein the IAB network further supports an implicit determination of availability of a soft resource.

50. The apparatus of claim 48, wherein the explicit release of the one or more soft resources is via downlink control information (DCI).

51. The apparatus of claim 48, wherein the capability indicates whether the IAB node supports the operation mode.

* * * * *